United States Patent [19]

Oike et al.

[11] Patent Number: 4,809,736
[45] Date of Patent: Mar. 7, 1989

[54] PISTON STRUCTURE FOR PRESSURE REDUCING VALVE

[75] Inventors: Tadashi Oike; Takeshi Yokoyama, both of Hyogo, Japan

[73] Assignee: TLV Co., Ltd., Hyogo, Japan

[21] Appl. No.: 84,440

[22] Filed: Aug. 11, 1987

[30] Foreign Application Priority Data

Aug. 12, 1986 [JP] Japan ................................ 61-124089

[51] Int. Cl.⁴ ........................................... F16K 31/122
[52] U.S. Cl. .................................. 137/489.5; 251/63.4
[58] Field of Search ............... 137/489.5; 251/62, 63.5, 251/63.4

[56] References Cited

U.S. PATENT DOCUMENTS

| 2,899,168 | 8/1959 | Kleczek | 251/63.5 |
| 3,734,455 | 5/1973 | Natho | 251/62 |
| 4,173,448 | 11/1979 | Rees | 251/62 X |
| 4,197,877 | 4/1980 | Winiasz | 137/489.5 X |
| 4,429,620 | 2/1984 | Burkhardt | 251/62 X |
| 4,615,354 | 10/1986 | Bianchi | 251/63.5 X |

Primary Examiner—Alan Cohan
Attorney, Agent, or Firm—Toren, McGeady & Associates

[57] ABSTRACT

A piston structure of a pressure reducing valve in which a piston is formed on its side surface with an annular groove for receiving a piston ring therein and is slidably inserted into a cylinder together with the piston ring, and a main valve is operatively opened and closed by regulating the operating pressure of the piston through a pilot valve for operatively detecting a secondary pressure, the outer peripheral edge of an upper surface of the piston is formed in outer peripheral direction, to be lower than a circle on the upper surface that is axially aligned with the bottom surface of the annular groove or a circle located more inwardly thereof, to prevent the upper corner of the piston from collision with an inner wall of the cylinder, when the piston is inclined by fluid jetted from the main valve.

5 Claims, 2 Drawing Sheets

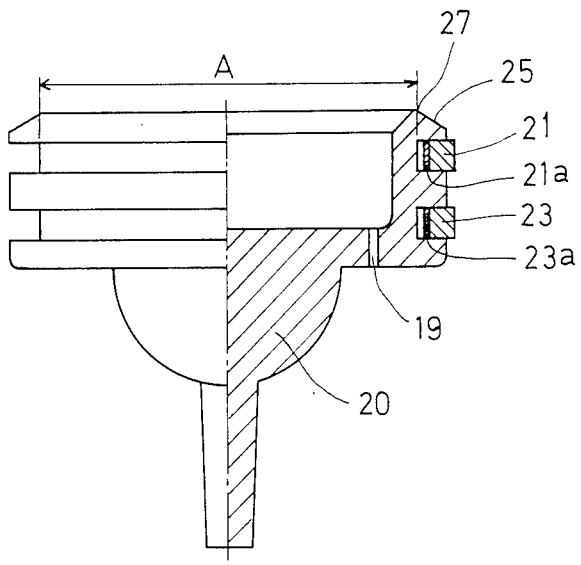
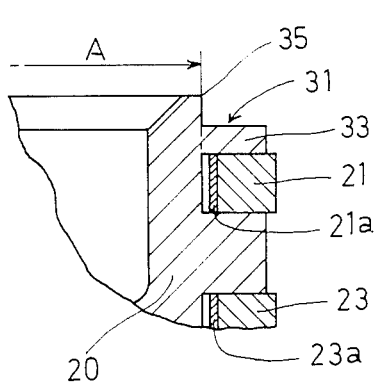
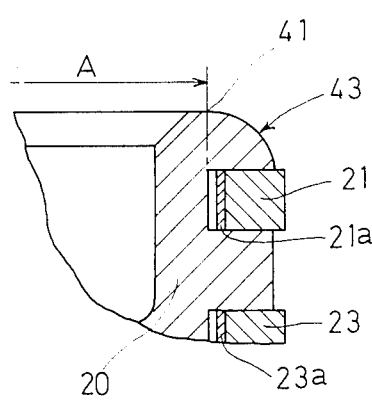

PISTON STRUCTURE FOR PRESSURE REDUCING VALVE

FIELD AND BACKGROUND OF THE INVENTION

This invention relates in general to a pressure reducing valve mounted on a piping system for compressed air, etc., to maintain a secondary side fluid pressure at a certain set pressure, and, in particular, to a piston structure for a pressure reducing valve in which the primary side fluid pressure acts on the upper surface of the piston through a pilot valve that is opened and closed by the detection of the secondary side pressure. The piston is operated by a pressure difference between the upper surface and the lower surface of the piston, communicating with the secondary side to operatively open and close a main valve connected to the piston.

This type of pressure reducing valve permits the primary side fluid which is introduced to the upper surface of the piston through a pilot valve, to act on the upper surface of the piston while the fluid escapes through a gap between the piston and a cylinder to regulate the fluid pressure acting on the upper surface of the piston.

As disclosed in Japanese Utility Model Laid-Open No. Sho 45-32717, a piston is provided on its side with two annular grooves in which piston rings are disposed. The piston is inserted into a cylinder so that the piston rings always bulge radially to uniformly contact the inside surface of the cylinder.

The piston becomes inclined by fluid that is jetted from the main valve so that the edge or corner of the piston may rub against the inner peripheral surface of the cylinder. This causes a malfunction whereby the piston no longer slides smoothly in the cylinder. To prevent this malfunction, the two piston grooves are spaced from each other as far as possible so that it becomes difficult to incline the piston. Thus, it is inevitable that the wall thicknesses of the upper annular groove and the upper surface of the piston are thinned.

When the piston is subjected to large vertical vibrations upon the occurrence of chattering in the piston structure, however, the thin wall thickness portion of the outer peripheral edge of the upper surface of the piston is deformed. This deformation is toward the side of the groove and is caused by the severe collision of the upper portion of the piston with the inner wall of a main body when the piston is inclined so that the piston ring is pinched in the groove. As a result, the gap between the piston and the cylinder becomes uneven so that the piston interferes with the cylinder to cause a malfunction (loss of smooth sliding).

SUMMARY OF THE INVENTION

A technical means to solve the above problem is constructed such that, in a type of pressure reducing valve wherein the piston is formed on its side surface with an annular groove for disposing a piston ring therein, and is slidably inserted into a cylinder with the piston ring being inserted in the groove and a main valve is operatively opened and closed by regulating the operating pressure of the piston through a pilot valve for operatively detecting a secondary pressure, the outer peripheral edge of the upper surface of the piston is made lower than a point located on the bottom surface of the annular groove formed on the side surface of the piston or a point further inside in the outer peripheral direction.

Even if the upper portion of the piston tries to collide severely with the inner wall of the main body under an inclined condition for the piston, the outer peripheral edge of the upper surface of the piston is formed beforehand so low that it does not abut against the inner wall of main body. Thus, even the thin wall thickness of the piston is not deformed so that the piston ring is never pinched in its groove.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 2 is an enlarged sectional view showing a piston of FIG. 1; and

FIGS. 3 and 4 are enlarged fragmentary sectional views showing other embodiments of the piston.

DESCRIPTION OF THE PREFERRED EMBODIMENTS

Figure 1:
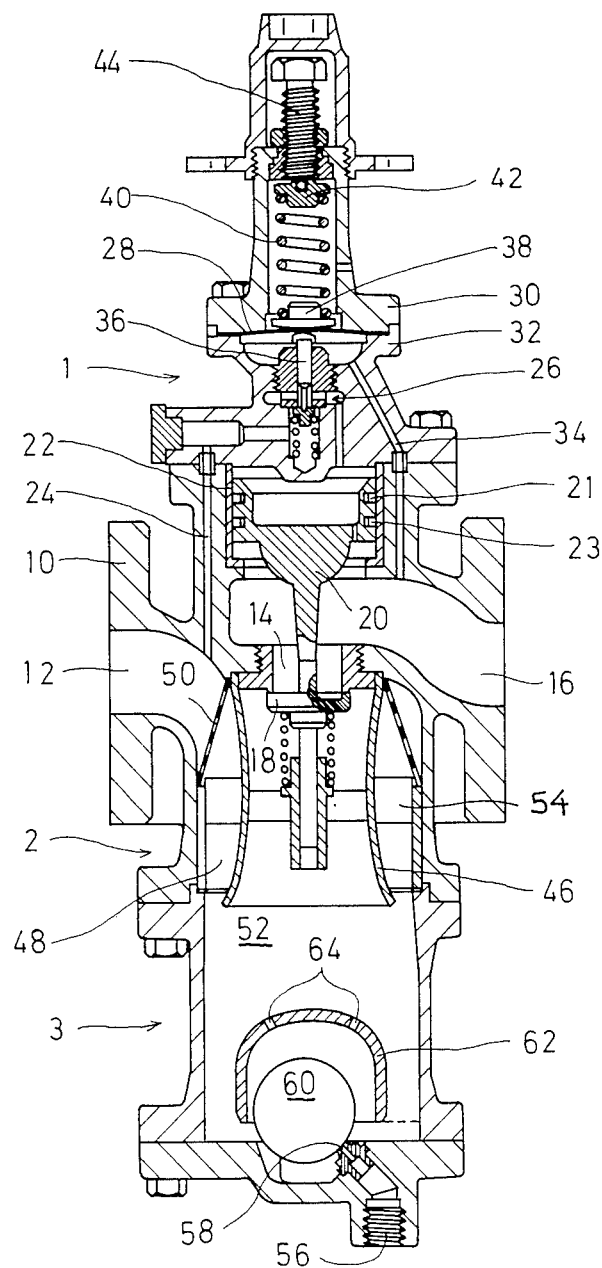
FIG. 1 is a sectional view showing an embodiment of a pressure reducing valve according to this invention.

Embodiment 1 (see FIGS. 1 and 2)

FIG. 1 is a sectional view showing a pressure reducing valve for steam in which a first embodiment of the piston is used.

This pressure reducing valve is constituted from a pressure reducing valve section 1, a gas-water separator section 2 and a drain valve section 3. A valve casing 10 is formed with an inlet 12, a valve port 14 and an outlet 16. The inlet is connected to a primary side, high pressure fluid source, and the outlet 16 to a secondary side, low pressure region. The valve port 14 is formed of a valve seat member.

A piston 20 is formed on its side surface with annular grooves in which are disposed piston rings 21, 23 to be inserted slidably into a cylinder 22 together with elastic members 21a, 23a urging the piston rings from the inside to the outside respectively. A piston rod is adapted to abut against a main valve 18 through the valve port 14 and open an orifice 19 (FIG. 2) affording communication between the upper and lower surfaces of the piston.

The piston is provided on the upper surface with a tapered or bevelled surface 25 inclined from a starting point or line (circle) 27 on the the circumference of inner diameter A of the annular groove, in the outer peripheral direction. Of course, an angle is made between this tapered surface and the upper surface of the piston such that the tapered surface does not abut against the inner wall of the main body facing the upper portion of the piston, even if the piston is inclined.

In a space above the inlet 12 and the piston 20, i.e. the primary pressure path 24 communicating with a piston chamber, a pilot valve 26 is disposed.

A diaphragm 28 is mounted with its outer peripheral edge being sandwiched between flanges 30 and 32. A space below the diaphragm 28 communicates with the outlet 16 through a secondary pressure path 34. Also, a head end face of a valve rod 36 of the pilot valve 26 bears against the central lower surface of the diaphragm 28. The valve rod 36 is pressed against the diaphragm 28 by the primary side fluid pressure and an elastic force of a coiled spring urging the body of the pilot valve 26.

On the upper surface of the diaphragm 28 is mounted a spring seat 38. A coiled spring 40 for setting pressure is disposed between the spring seat 38 and a spring carrier 42. An end of an adjustment screw 44, threadingly engaging the valve casing 10, is adapted to bear against the spring carrier 42.

By turning the adjustment screw 44 to the left or right, the spring carrier is displaced to vary a force of the pressure setting spring 40 for depressing the diaphragm 8. The diaphragm 28 is bent with reference to the elastic force of the pressure setting spring 40 in response to the secondary side pressure acting on the lower surface of the diaphragm, to displace the valve rod 36 and open or close the pilot valve 26. As a result, the primary side fluid pressure is introduced into the piston chamber to drive the piston 20, displace the main valve 18 and send fluid at the inlet 12 through the valve port 14 to the outlet 16. This is automatically operated such that the valve port 14 is opened when the secondary side fluid pressure is reduced and closed when said pressure is increased.

The upper portion of an annular space 48 between a cylindrical partition wall member 46 mounted below the valve port 14 and the valve casing 10 surrounding said member 46, communicates with the inlet 12 through a conical screen 50. The lower portion of this space communicates with the upper portion of a drain valve chamber 52. Also, the upper portion of the drain valve chamber 52 communicates with the valve port 14 through a central opening of the partition wall member 46. In the annular space 48 is disposed a turning blade 54 formed of an inclined wall.

Thus, when the valve port 14 is opened, the fluid at the inlet 12 is redirected and turned by the turning blade 54 when the fluid passes through the annular space 48 and is thrown to the outside. The fluid then abuts against the inner wall of the surrounding valve casing, and flows down to the drain valve chamber 52. Light gas turns around the central portion, advances from the central opening of the partition wall member 46 to the valve port 14 and passes by the valve port to flow to the outlet 16.

The drain valve chamber 52 is formed on the bottom with a drain valve port 58 communicating with a drain port 56. Also, a spherical valve float 60 is received in the bottom displaceably, and is covered with a float cover 62. A vent hole 64 is provided in the upper portion of the float cover 62.

Thus, the valve float 60 sinks according to the water level of the drain valve chamber 52 to open or close the drain water reserved in the drain valve chamber 52.

It is noted that in all embodiments of the invention, the piston of the pressure reducing valve has an upper surface with an outer peripheral edge or area that is located in an outer peripheral direction, lower than a line or circle (for example, 27 in FIG. 2) on the upper surface and at an outermost position which is axially aligned with the bottom surface of the groove which receives the piston ring. In other words, the inner diameter A is at most in axial alignment with the bottom of the annular grooves and may in fact be smaller in diameter than the bottom of the grooves.

In the drawings, the same reference numerals are used to designate the same or similar parts.

Embodiment 2 (see FIG. 3)

This embodiment provides, on the upper surface of the piston 20, an annular step portion 31 extending from the starting point or line 35 on the circumference of inner diameter A of the annular groove in the outer peripheral direction. The piston ring 21 is supported by disk-like portions 33. The description of the operation of this piston for the pressure reducing valve is omitted since it is the same as that of the embodiment 1.

Embodiment 3 (see FIG. 4)

This embodiment is provided on the upper surface of piston 20 with a spherical surface 43 extending from the starting point or line 41 on the circumference of inner diameter A of the annular groove in the outer peripheral direction. The description of the operation of the spherical surface for the pressure reducing valve is omitted since it is the same as that of embodiment 1.

In another embodiment, other than those discussed above, the upper surface of the piston may be made flat and the annular groove may be provided on the inner wall surface of the main body opposed to the outer peripheral edge of said upper surface.

This invention has the following peculiar effects:

The piston is not deformed and the piston ring is not pinched even during shocks such as during chattering or the like. Thus, the interval between two piston rings can be provided so large that the piston does not interfere with the cylinder, but keeps sliding smoothly for a long time even under a somewhat inclined condition.

While only certain embodiments of the present invention have been described, it will be apparent to those skilled in the art that various changes and modifications may be made therein without departing from the spirit and scope of the present invention as claimed.

The invention claimed is:

1. In a pressure reducing valve having a piston formed on a side surface thereof with an annular groove for receiving a piston ring therein, the piston being slidably inserted in a cylinder together with the piston ring which is disposed in the groove, and a main valve which is operatively opened and closed by regulating an operating pressure of the piston through a pilot valve for operatively detecting a secondary pressure, the improvement comprising, the piston being arranged to operate said main valve by pressing on an operating element in said main valve, wherein said piston is not connected to said main valve, and said piston having an upper surface with an outer peripheral edge that is located in an outer peripheral direction, lower than a line located on the upper surface and at an outermost position which is axially aligned with a bottom surface of the annular groove formed on the side surface of the piston, whereby only said upper surface of said piston can come in contact with a head end of said cylinder thereby preventing distortion of said groove containing said piston ring.

2. The improvement of claim 1 wherein the outer peripheral edge is inclined to form a bevelled edge.

3. The improvement of claim 1 wherein the outer peripheral edge is formed by a recessed step.

4. The improvement of claim 1 wherein the outer peripheral edge is formed by a spherical surface.

5. The improvement of claim 1 wherein the line is located radially inwardly of a position of axial alignment with the bottom surface of the annular groove.

* * * * *